(12) United States Patent
Takajo et al.

(10) Patent No.: US 11,045,902 B2
(45) Date of Patent: Jun. 29, 2021

(54) LINEAR GROOVE FORMATION METHOD AND LINEAR GROOVE FORMATION DEVICE

(71) Applicant: JFE STEEL CORPORATION, Tokyo (JP)

(72) Inventors: Shigehiro Takajo, Tokyo (JP); Masanori Uesaka, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 202 days.

(21) Appl. No.: 15/575,920

(22) PCT Filed: Jul. 6, 2016

(86) PCT No.: PCT/JP2016/003217
§ 371 (c)(1),
(2) Date: Nov. 21, 2017

(87) PCT Pub. No.: WO2017/017908
PCT Pub. Date: Feb. 2, 2017

(65) Prior Publication Data
US 2018/0147663 A1 May 31, 2018

(30) Foreign Application Priority Data
Jul. 28, 2015 (JP) .............................. JP2015-148891

(51) Int. Cl.
*B23K 26/073* (2006.01)
*C25F 3/06* (2006.01)
(Continued)

(52) U.S. Cl.
CPC ........ *B23K 26/0738* (2013.01); *B23K 26/073* (2013.01); *B23K 26/364* (2015.10);
(Continued)

(58) Field of Classification Search
None
See application file for complete search history.

(56) References Cited

U.S. PATENT DOCUMENTS

| | | | |
|---|---|---|---|
| 4,468,551 A * | 8/1984 | Neiheisel | B23K 26/073 219/121.6 |
| 4,750,949 A | 6/1988 | Kobayashi et al. | |

(Continued)

FOREIGN PATENT DOCUMENTS

| | | |
|---|---|---|
| DE | 3711905 A1 | 10/1988 |
| EP | 0334221 A2 | 9/1989 |

(Continued)

OTHER PUBLICATIONS

Jul. 16, 2018, the Extended European Search Report issued by the European Patent Office in the corresponding European Patent Application No. 16830016.8.

(Continued)

*Primary Examiner* — Stefanie J Cohen
*Assistant Examiner* — Christopher D. Moody
(74) *Attorney, Agent, or Firm* — Kenja IP Law PC

(57) ABSTRACT

A linear groove formation method of forming linear grooves in a steel sheet surface using etching can form linear grooves of a uniform shape while suppressing a decrease in magnetic property of a grain-oriented electrical steel sheet caused by laser irradiation for resist removal. A linear groove formation method includes: coating a surface of a grain-oriented electrical steel sheet with a resist; performing a laser scan cyclically in a rolling direction of the grain-oriented electrical steel sheet, the laser scan being applying a laser while scanning the laser in a direction crossing the rolling direction to remove the resist in a portion irradiated with the laser; and etching the grain-oriented electrical steel sheet in each portion in which the resist is removed, to form a linear (Continued)

groove. A coating thickness of the resist is 0.5 μm to 10 μm, and a power of the laser is 1500 W or more.

5 Claims, 10 Drawing Sheets

(51) Int. Cl.
  *C23F 1/28* (2006.01)
  *B23K 26/364* (2014.01)
  *C21D 8/12* (2006.01)
  *C21D 10/00* (2006.01)
  *H01F 1/16* (2006.01)

(52) U.S. Cl.
  CPC ............ *C21D 8/12* (2013.01); *C21D 8/1277* (2013.01); *C21D 10/005* (2013.01); *C23F 1/28* (2013.01); *C25F 3/06* (2013.01); *H01F 1/16* (2013.01)

(56) References Cited

U.S. PATENT DOCUMENTS

| | | | | |
|---|---|---|---|---|
| 4,904,312 A * | 2/1990 | Beckley | ............... | C21D 8/1294 148/110 |
| 4,985,116 A | 1/1991 | Mettler et al. | | |
| 5,013,373 A * | 5/1991 | Block | ................. | C21D 8/1294 148/110 |
| 5,013,374 A * | 5/1991 | Block | ................. | C21D 8/1294 148/113 |
| 5,393,355 A * | 2/1995 | Nakano | .................... | H01F 1/18 148/306 |
| 5,413,639 A * | 5/1995 | Sato | ......................... | C23F 1/02 148/111 |
| 5,665,455 A * | 9/1997 | Sato | ........................ | C21D 7/04 148/111 |
| 6,228,182 B1 * | 5/2001 | Nakano | ............... | C21D 8/1294 148/111 |
| 6,811,900 B2 * | 11/2004 | Inokuti | ............... | C21D 8/1288 148/113 |
| 8,034,196 B2 * | 10/2011 | Iwata | ................... | C21D 8/1294 148/111 |
| 8,657,968 B2 * | 2/2014 | Sakai | ................... | C21D 8/1266 148/307 |
| 2002/0046997 A1 * | 4/2002 | Nam | .................. | B23K 26/0736 219/121.72 |
| 2003/0164307 A1 * | 9/2003 | Mogi | ....................... | C25F 3/06 205/640 |
| 2012/0171467 A1 * | 7/2012 | Takeda | .................. | C09D 5/084 428/327 |
| 2013/0017408 A1 * | 1/2013 | Sakai | ................... | C21D 8/1294 428/600 |
| 2013/0049557 A1 * | 2/2013 | Ho | ....................... | H05K 5/0243 312/223.2 |
| 2013/0052376 A1 * | 2/2013 | Ho | ........................ | G06F 1/1613 428/34.1 |
| 2014/0042681 A1 * | 2/2014 | Kooney | ............... | B25B 11/002 269/8 |
| 2018/0036838 A1 * | 2/2018 | Hamamura | ......... | C21D 8/1294 |
| 2018/0043474 A1 * | 2/2018 | Hamamura | ......... | B05D 3/0254 |

FOREIGN PATENT DOCUMENTS

| | | |
|---|---|---|
| JP | S6376819 A | 4/1988 |
| JP | H04503718 A | 7/1992 |
| JP | H0732575 A | 2/1995 |
| JP | H11279646 A | 10/1999 |
| JP | H11293340 A | 10/1999 |
| JP | 2000328139 A | 11/2000 |
| JP | 2013030523 A | 2/2013 |
| JP | 2015071815 A | 4/2015 |

OTHER PUBLICATIONS

Oct. 11, 2016, International Search Report issued in the International Patent Application No. PCT/JP2016/003217.

Dec. 3, 2018, Office Action issued by the State Intellectual Property Office in the corresponding Chinese Patent Application No. 201680042049.0 with English language search report.

Nov. 16, 2018, Office Action issued by the Canadian Intellectual Property Office in the corresponding Canadian Patent Application No. 2987379.

* cited by examiner

PRIOR ART

PRIOR ART

LINEAR GROOVE FORMATION METHOD AND LINEAR GROOVE FORMATION DEVICE

TECHNICAL FIELD

The disclosure relates to a method of forming linear grooves in a steel sheet surface. The disclosure particularly relates to a linear groove formation method that forms linear grooves in a steel sheet surface using etching and by which linear grooves of a uniform shape can be formed while suppressing a decrease in magnetic property of a grain-oriented electrical steel sheet caused by laser irradiation for resist removal. The disclosure also relates to a linear groove formation device suitable for the method.

BACKGROUND

Grain-oriented electrical steel sheets with excellent magnetic property are mainly used as iron core material for transformers, and are required to have lower iron loss to improve the energy use efficiency of transformers. Known methods of reducing the iron loss of grain-oriented electrical steel sheets include a method of surface-treating a steel sheet, in addition to a method of highly aligning secondary recrystallized grains of a steel sheet with Goss orientation (sharpening), a method of increasing film tension, a method of thinning a steel sheet, and the like.

The iron loss reduction technique by surface-treating a steel sheet introduces non-uniform strain into a steel sheet surface by a physical method and refines the magnetic domain width to reduce iron loss. One such technique is a method of forming grooves in a surface of a final-annealed steel sheet using a toothed roll. With this method, the magnetic domains of the steel sheet surface are refined by forming grooves, with it being possible to reduce the iron loss of the steel sheet. Moreover, even in the case where heat treatment such as stress relief annealing is performed after the groove formation, the introduced grooves are not lost, and thus the iron loss reduction effect is maintained. However, this method is problematic in that the groove shape tends to be not uniform due to significant wear of the toothed roll, and raising the temperature of the toothed roll or coating the toothed roll with a lubricant to keep the toothed roll from wear leads to an increase in manufacturing cost.

In view of this, a method of forming linear grooves in a steel sheet surface by etching without using mechanical means such as a toothed roll has been developed. In detail, a steel sheet surface before a forsterite film is formed is coated with resist ink in a pattern, and then each portion not coated with the resist ink is selectively etched using a method such as electroetching, to form a groove in the steel sheet surface. With this method, mechanical wear of the device hardly occurs, so that maintenance is easier than the method using the toothed roll.

The magnetic property of a steel sheet in which such linear grooves are formed is known to be greatly influenced by the shape of the linear grooves. Note only the groove depth and the groove width but also shape details such as the curvature of the groove section have been found to influence iron loss. Accordingly, if the shape of the resist serving as an etching mask has variation when forming linear grooves by the above-mentioned method using etching, the groove shape varies, resulting in variation in the magnetic property of the steel sheet. This has led to the proposal of techniques of improving the resist coating accuracy to reduce variation in the magnetic property of the steel sheet in the method of forming linear grooves by etching.

For example, JP H11-279646 A (PTL 1) proposes a technique of, when applying a resist, controlling the temperature of each of the resist ink and the steel sheet constant to form linear grooves of a uniform shape. By maintaining a constant temperature, variation in the viscosity of the resist ink is reduced to thus reduce variation in groove shape.

JP H07-032575 A (PTL 2) proposes a technique of, when applying a resist by gravure offset printing, controlling conditions such as the viscosity of the resist ink and the mesh pattern of the gravure roll within specific ranges. In this way, halftone dots caused by gravure cells formed in the surface of the gravure roll are suppressed to improve the accuracy of the resist pattern.

In fields other than grain-oriented electrical steel sheets, techniques of patterning a resist using a laser have also been proposed. For example, JP H04-503718 A (PTL 3) proposes a method of, when performing plating or etching in the manufacture of a printed wiring board, an electrical connector, or the like, removing resist ink applied to a material surface by a low-power laser to form a resist pattern used as a mask.

JP 2013-030523 A (PTL 4) proposes a method of, in the manufacture of a metal-ceramic joined circuit board, forming a resist so as to cover surfaces of a metal sheet for circuitry and a metal base sheet of the metal-ceramic joined board, and irradiating the resist with a laser to remove unwanted portions of the resist. After the resist removal by the laser, the exposed metal is etched to form a circuit pattern.

CITATION LIST

Patent Literatures

PTL 1: JP H11-279646 A
PTL 2: JP H07-032575 A
PTL 3: JP H04-503718 A
PTL 4: JP 2013-030523 A

SUMMARY

Technical Problem

However, with the methods proposed in PTL 1 and PTL 2, the formed linear grooves still have variation in shape, although the resist shape accuracy is improved to some extent. This can be explained as follows.

To form linear grooves in a steel sheet surface by etching, an etching resist needs to be applied in a pattern. Although in principle various coating methods are available for such resist coating, gravure offset printing which is suitable for continuous coating for a long base material and enables stable coating even for a hard base material such as a steel sheet is typically used.

FIG. 11 is a schematic diagram illustrating a typical structure of a gravure offset printing device 100 used for gravure offset printing. In gravure offset printing, first, ink 102 is applied to a surface of a gravure roll 103 using a pick-up roll 101. The surface of the gravure roll 103 has gravure cells 104 which are depressions for holding ink. The ink adhering to portions other than the cells is removed with a doctor blade 105. After this, the coating material is transferred to a surface of an offset roll 106, and then transferred to a surface of a substrate 107.

To form linear grooves in a surface of a grain-oriented electrical steel sheet by etching, the above-mentioned printing method can be used to form a resist pattern serving as an etching mask. FIG. 12 illustrates an example of the resist pattern. In this example, a surface of a steel sheet 110 is coated with a resist 111 cyclically in the rolling direction. Non-coating portions 112 not coated with the resist exist between the portions coated with the resist. In these portions, the surface of the steel sheet is exposed. Hence, when etching is performed on the steel sheet, the steel sheet surface in the non-coating portions is selectively etched, thus forming linear grooves.

However, our study revealed that it is difficult to achieve the ideal shape as illustrated in FIG. 12 with a resist pattern formed by a printing method such as gravure offset printing, and the actual resist pattern is in a shape as illustrated in FIG. 13. In detail, the boundary between a coating portion coated with a resist and a non-coating portion has a gently-sloping section as illustrated in FIG. 13, and its shape differs according to location. The shape of each non-coating portion 112 as seen from above the steel sheet varies, unlike the ideal linear shape illustrated in FIG. 12.

Such variation cannot be completely eliminated even when the resist ink and the steel sheet are temperature-controlled as described in PTL 1, and so seems to be inevitable in resist pattern formation by gravure offset printing. In gravure offset printing, the resist ink is transferred from the gravure roll to the steel sheet surface via the offset roll, as mentioned above. The shape of the resist ink transferred to the offset roll surface is a convex bowl shape bulging outward, as illustrated in FIG. 14. This results in such a gently-sloping end surface of the resist pattern formed by transferring the resist ink to the steel sheet surface as illustrated in FIG. 13. Besides, since the shape of the resist ink is affected by variation in gravure cell shape, the shape differs according to location.

To avoid such a problem in gravure offset printing, instead of directly forming the resist pattern by printing using the gravure roll, the resist pattern may be formed using a laser as described in PTL 3 and PTL 4. In detail, after coating the whole steel sheet surface uniformly with the resist, the portions where the coating is not required are irradiated with the laser to instantaneously evaporate or sublime the resist, thus selectively removing the resist in the irradiated portions. With this method, the shape of each portion subjected to resist removal is unaffected by gravure cell variation and the like, so that the formation of linear grooves of a uniform shape is expected.

However, our study revealed that simply applying the resist removal technique using a laser to a grain-oriented electrical steel sheet cannot achieve excellent magnetic property. In a grain-oriented electrical steel sheet, crystal orientation alignment is necessary to obtain excellent magnetic property. If a laser is used to remove the resist, the steel sheet of the portions irradiated with the laser is heated and increases in temperature, as a result of which the crystal microstructure undergoes a change such as recrystallization and becomes non-uniform. This causes a decrease in the magnetic property of the steel sheet.

It could be helpful to provide a method that forms linear grooves in a steel sheet surface using etching and by which linear grooves of a uniform shape can be formed while suppressing a decrease in magnetic property of a grain-oriented electrical steel sheet caused by laser irradiation for resist removal. It could also be helpful to provide a linear groove formation device suitable for the method.

Solution to Problem

We examined how resist removal by laser irradiation influences a grain-oriented electrical steel sheet (steel substrate), and discovered the following:

(1) The resist removal ratio differs according to power, even when the laser irradiation energy is constant.

(2) When the resist is removed using a low-power laser, the steel substrate melts noticeably.

(3) The resist removal ratio is influenced by the coating thickness of the resist.

(4) With a beam diameter of 0.1 mm or less, particularly excellent magnetic property is achieved.

Based on these discoveries, we conducted close study on the conditions of resist removal by laser irradiation.

We thus provide:

1. A linear groove formation method comprising: coating a surface of a grain-oriented electrical steel sheet with a resist; performing a laser scan cyclically in a rolling direction of the grain-oriented electrical steel sheet, the laser scan being applying a laser while scanning the laser in a direction crossing the rolling direction of the grain-oriented electrical steel sheet to remove the resist in a portion irradiated with the laser; and etching the grain-oriented electrical steel sheet in each portion in which the resist is removed, to form a linear groove, wherein a coating thickness of the resist is 0.5 μm to 10 μm, and a power of the laser is 1500 W or more.

2. The linear groove formation method according to 1, wherein the laser scan is performed using one to five laser irradiation devices, a scanning time t per one laser scan is 2.5 msec or more, and a ratio Y of a steel sheet scanning time t' during which the applied laser is actually scanned on the surface of the grain-oriented electrical steel sheet in one laser scan to the scanning time t per one laser scan is 0.8 or less, where $Y=t'/t$.

3. The linear groove formation method according to 2, wherein the laser scan is performed using one to three laser irradiation devices, a beam diameter of the laser in a direction orthogonal to a scanning direction of the laser is more than 0.1 mm and 0.4 mm or less, and a ratio of a major axis length to a minor axis length of the laser is 1.25 or less.

4. The linear groove formation method according to 2, wherein the laser scan is performed using four or five laser irradiation devices, a beam diameter of the laser in a direction orthogonal to a scanning direction of the laser is 0.03 mm or more and 0.1 mm or less, and a ratio of a major axis length to a minor axis length of the laser is 1.1 or less.

5. A linear groove formation device comprising: a deliverer that delivers a coiled grain-oriented electrical steel sheet; a welder that joints coils to each other; a resist coater that coats a surface of the grain-oriented electrical steel sheet with a resist; a dryer that dries the resist applied on the surface of the grain-oriented electrical steel sheet; a laser irradiator that irradiates, with a laser, the surface of the grain-oriented electrical steel sheet coated with the resist, to remove the resist partially; an etcher that etches the grain-oriented electrical steel sheet in each portion in which the resist is removed; a resist remover that removes the resist from the surface of the grain-oriented electrical steel sheet; a cutter that cuts the grain-oriented electrical steel sheet; and a coiler that coils the grain-oriented electrical steel sheet, arranged in the stated order, and the linear groove formation device further comprising a looper that keeps a sheet passing rate in the laser irradiator constant.

Advantageous Effect

It is thus possible to, with a method of forming linear grooves in a steel sheet surface using etching, form linear grooves of a uniform shape while suppressing a decrease in magnetic property of a grain-oriented electrical steel sheet caused by laser irradiation for resist removal. Such a method provides excellent productivity, as excellent magnetic property can be achieved even in high-speed treatment. Moreover, the use of the yielded grain-oriented electrical steel sheet contributes to higher energy use efficiency of transformers.

DETAILED DESCRIPTION

Figure 1:
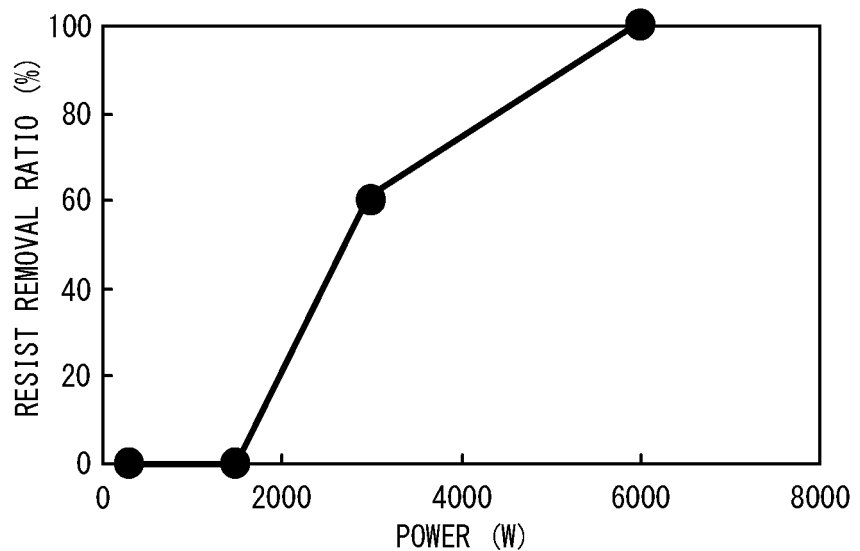
FIG. 1 is a diagram illustrating the relationship between the laser power and the resist removal ratio.
Figure 2:
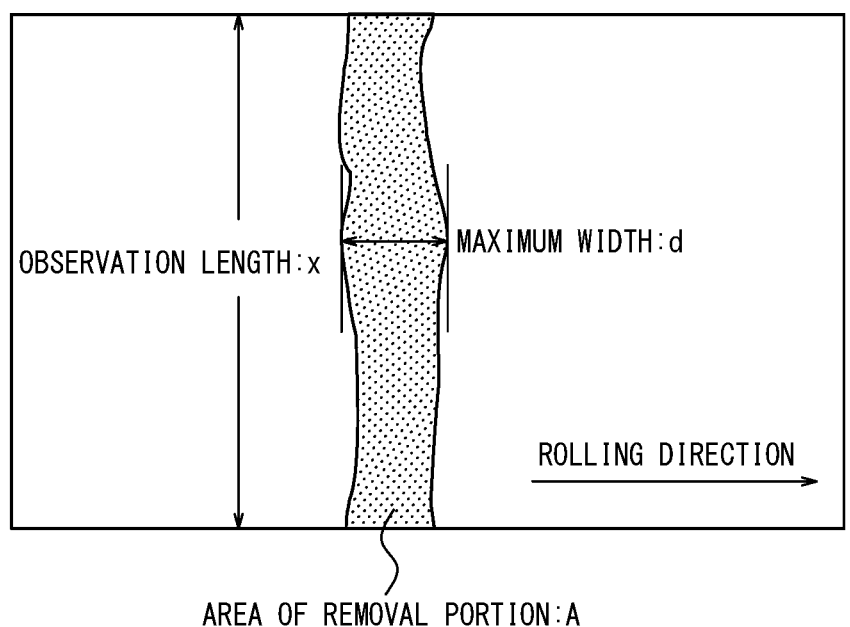
FIG. 2 is a diagram schematically illustrating a resist removal portion after laser irradiation according to one of the disclosed embodiments.

The results of examining how the laser irradiation conditions and the resist coating thickness influence resist removal are described below. FIG. 1 is a diagram illustrating the relationship between the laser power (W) and the resist removal ratio (%) when irradiating, with a laser, a grain-oriented electrical steel sheet (hereafter also simply referred to as "steel sheet") coated with a resist uniformly on its surface, while scanning the laser. In the experiment, the minor axis length of the laser was 0.2 mm, and the laser irradiation energy per unit scanning length (hereafter also simply referred to as "irradiation energy") was 60 J/m. In the case where the resist removal ratio is 100%, the resist in each portion irradiated with the laser is completely removed, and a strip-shaped resist removal portion is formed in the site scanned with the laser. In the case where the resist removal ratio is less than 100%, the resist is removed non-uniformly, and the strip-shaped portion where the resist removal portion is formed is not constant in width or the resist remains in the strip-shaped portion. The resist removal ratio mentioned here is a ratio expressed by $A/(d \times x) \times 100$ for the range of a predetermined length (observation length) of the resist removal portion after laser irradiation, where x is the predetermined length, d is the maximum width of the resist removal portion (in the rolling direction), and A is the area of the resist removal portion, as illustrated in FIG. 2. The resist removal ratio is rounded off to the nearest ten. Here, x is 3 mm.

As illustrated in FIG. 1, when the laser power is higher, the resist removal ratio is higher. Thus, the resist removal ratio depends on the power, despite the beam diameter and the irradiation energy being kept constant to make the energy density constant. This indicates that controlling the laser power is important in resist removal by laser irradiation.

Figure 3:
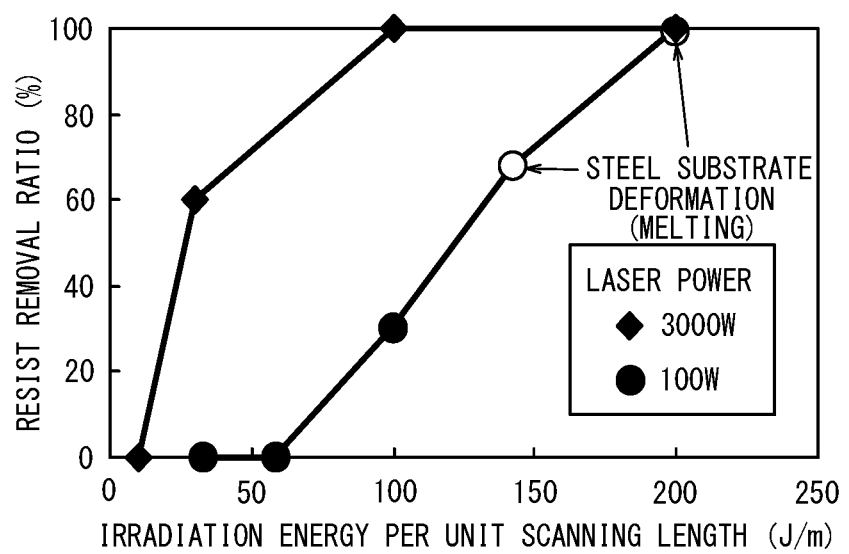
FIG. 3 is a diagram illustrating the relationship between the laser irradiation energy per unit scanning length and the resist removal ratio.

FIG. 3 is a diagram illustrating the relationship between the laser irradiation energy per unit scanning length (J/m) and the resist removal ratio (%). The laser power was 100 W and 3000 W. As illustrated in FIG. 3, the resist removal ratio increases when the irradiation energy is increased. With the same irradiation energy, the resist removal ratio is higher when the power is higher. In the case of increasing the irradiation energy to achieve a resist removal ratio of 100% with a power of 100 W, a deformation due to melting of the steel substrate was visible in the conditions designated by white circles in FIG. 3.

Figure 4:
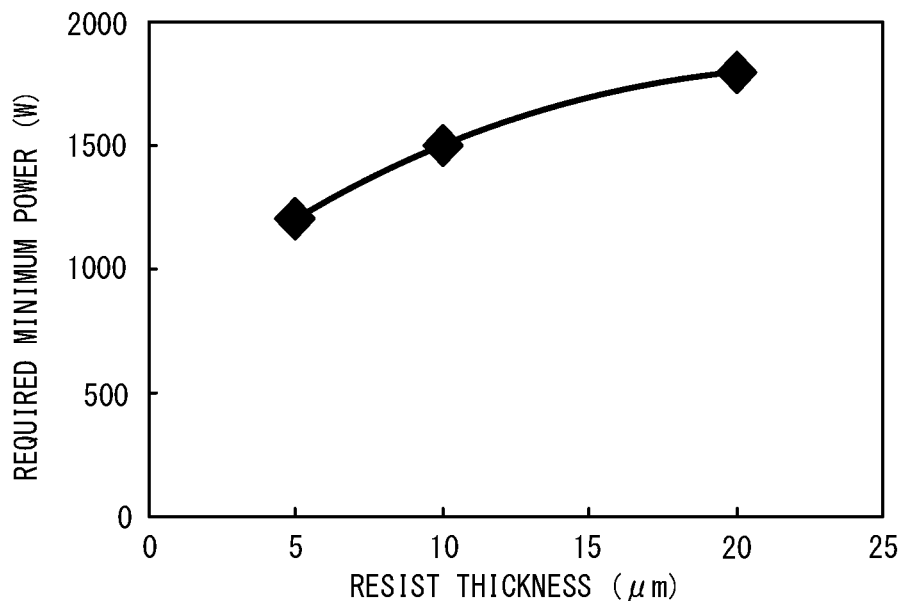
FIG. 4 is a diagram illustrating the relationship between the resist coating thickness and the minimum laser power required to remove the resist at 100%.

FIG. 4 is a diagram illustrating the relationship between the resist coating thickness and the minimum laser power required to remove the resist at 100%. In the experiment, the beam diameter was 0.2 mm, and the irradiation energy per unit scanning length was 60 J/m. The result indicates that the minimum laser power required to remove the resist at 100% increases as the resist coating thickness increases.

A method according to one of the disclosed embodiments is described in detail below, based on these results. The following description merely concerns one of the preferred embodiments according to the disclosure, and the disclosure is not limited by the following description. The terms used in this description are defined as follows, unless otherwise stated.

"Laser removal portion": a portion where a surface of a grain-oriented electrical steel sheet is exposed as a result of a resist being removed by laser irradiation in a laser irradiation process.

"Resist removal ratio": the ratio of the resist removed in a portion irradiated with the laser.

"Scanning time t": the time required per one laser scan, i.e. the time from the start of one laser scan to the start of the next laser scan.

"Steel sheet scanning time t'": the time during which the applied laser is actually scanned on the steel sheet surface in one scan, i.e. the time during which the steel sheet surface is irradiated with the laser in one scan.

"Scanning length L": the scanning length per one laser irradiation device in one scan.

"Scanning rate v": the scanning rate (velocity) of the laser applied in the laser irradiation process on the steel sheet surface, where $v = L/t$.

"Power P": the power of the laser applied in the laser irradiation process.

"Irradiation energy per unit scanning length E (J/m)": the energy of the laser scanned in the laser irradiation process per 1 m in scanning length (also simply referred to as "irradiation energy"), where E=P/v.

"Line speed $v_L$": the rate of the steel sheet conveyed in the treatment device (also referred to as "sheet passing rate"). In the case where the rate differs according to the location in the treatment device, the rate in the laser irradiation location is used. In the treatment device, the steel sheet is conveyed in its rolling direction, unless otherwise stated.

"Linear groove spacing s": the spacing of linear grooves formed in the steel sheet surface, in the rolling direction. This is equal to the spacing of resist removal portions formed in the laser irradiation process, in the rolling direction.

In the method according to this embodiment, the following processes (1) to (3) are performed on a grain-oriented electrical steel sheet in sequence:

(1) resist coating process;
(2) laser irradiation process; and
(3) etching process.

A resist drying process may be optionally performed between (1) resist coating process and (2) laser irradiation process. A resist removal process may be optionally performed after (3) etching process.

[Grain-Oriented Electrical Steel Sheet]

In this embodiment, a grain-oriented electrical steel sheet (including a steel sheet at an intermediate stage in a grain-oriented electrical steel sheet manufacturing process) is used as a base material. The grain-oriented electrical steel sheet is not limited, and may be any grain-oriented electrical steel sheet. In terms of iron loss reduction, however, the grain-oriented electrical steel sheet preferably contains Si in the range of 2.0 mass % to 8.0 mass %. In addition, in terms of sheet passage, the grain-oriented electrical steel sheet more preferably contains Si in the range of 2.5 mass % to 4.5 mass %.

If a coating is formed on the surface of the grain-oriented electrical steel sheet, etching could be hampered depending on the type of the coating. It is therefore preferable that no coating insoluble or poorly soluble in an etchant (electrolytic solution), such as a forsterite film or a tension-applying coating, is formed on the surface of the steel sheet so that the below-mentioned resist is directly applied to the surface of the steel sheet.

[Resist Coating Process]

The surface of the steel sheet is coated with a resist, before laser irradiation. The resist serves as an etching resist for preventing the steel sheet from being etched in the below-mentioned etching process. The resist may be any material that can prevent the etching of the steel sheet, but a resist having thermosetting resin as a main component is preferable. The thermosetting resin may be, for example, at least one selected from the group consisting of alkyd-based resin, epoxide-based resin, and melamine-based resin. UV curability or electron radiation curability used in the field of semiconductors is not necessarily required. In terms of suppressing ink dripping, the resin preferably has high viscosity. To maintain high viscosity of the resist, the temperature of the resist applied is preferably 40° C. or less. No lower limit is placed on the temperature of the resist, yet the temperature of the resist is preferably 20° C. or more. An insulating coating typically formed on a surface layer of an electrical steel sheet may be used as the resist, although this involves an increase in device size. Resist coating in such a case may be performed according to a conventional technique. The same applies to drying.

The method of coating the steel sheet surface with the resist is not limited, and may be any method. Roll coating is, however, preferable. In particular, gravure printing using a gravure roll is preferable, and gravure offset printing using an offset roll is more preferable. In this description, "gravure printing" means all kinds of printing methods using gravure rolls, including gravure offset printing. In the case of using gravure printing, it is preferable to install a doctor blade above the gravure roll to make the ink quantity uniform, for constant thickness.

The resist coating pattern in this embodiment is not limited, and may be any pattern that enables desired linear grooves to be formed eventually. It is, however, preferable to coat the whole steel sheet surface with the resist.

The resist coating thickness is 0.5 µm to 10 µm. With a coating thickness of 0.5 µm or more, the steel sheet in the portion coated with the resist can be prevented from being etched in the etching process. With a coating thickness of 10 µm or less, the resist removed in the laser irradiation process can be reduced to suppress fluctuation in laser property caused by, for example, the vaporized resist adhering to the optical system in the laser irradiation device. The resist coating thickness is more preferably 1 µm to 5 µm. The resist coating thickness mentioned here is the thickness of the resist immediately before etching.

[Resist Drying Process]

After the resist coating, the resist is preferably dried before the subsequent laser irradiation process. The drying method is not limited, and may be, for example, hot air drying or vacuum drying. In the case of hot air drying, the drying temperature is preferably 180° C. to 300° C. In the case of vacuum drying, the pressure is preferably 10 Pa or less, and the drying time is preferably 5 sec or more.

[Laser Irradiation Process]

Following this, the surface of the grain-oriented electrical steel sheet coated with the resist is irradiated with a laser, while scanning the laser in a direction crossing the rolling direction of the grain-oriented electrical steel sheet. By this laser irradiation, the resist in the portion irradiated with the laser is locally heated to vaporize, thus being removed. As a result, a resist removal portion in which the surface of the steel sheet is exposed is formed. The steel sheet exposed in the resist removal portion is selectively etched in the below-mentioned etching process, to form a linear groove. Since the arrangement and dimensions of linear grooves formed by etching influence the final magnetic property of the grain-oriented electrical steel sheet, the pattern of the etching resist, i.e. the arrangement and dimensions of resist removal portions, may be determined based on the magnetic property of the steel sheet.

The laser is preferably scanned linearly. The laser scanning direction may be any direction crossing the rolling direction. In terms of enhancing the iron loss reduction effect, however, the laser scanning direction is preferably at an angle of 40° or less with respect to the transverse direction of the steel sheet, and more preferably the transverse direction of the steel sheet (i.e. the direction orthogonal to the rolling direction).

A laser scan in the laser irradiation process is performed cyclically in the rolling direction of the grain-oriented electrical steel sheet. In other words, the laser scan is repeatedly performed so that resist removal portions are formed at regular spacings in the rolling direction. The resist removal portion spacing in the rolling direction (hereafter referred to as "resist removal portion spacing") is preferably 2 mm or more and 10 mm or less. The spacing of linear grooves formed by etching in the rolling direction (hereafter referred to as "linear groove spacing") is equal to the resist removal portion spacing. Hence, by setting the resist removal portion spacing in the above-mentioned range, the linear groove spacing in the suitable range can be achieved to further improve the magnetic property of the grain-oriented electrical steel sheet.

The laser may be any laser that can remove the resist. In terms of high power, however, a solid-state laser such as a fiber laser, a $CO_2$ laser, or the like is preferable. The laser is preferably scanned by rotary driving of mirrors such as galvanometer mirrors or polygon mirrors, in terms of high speed.

Any number of laser irradiation devices (irradiation sources) may be used for the laser irradiation. The number of irradiation devices is, however, preferably 1 to 5. If the number of irradiation devices is more than 5, the time required for maintenance increases and productivity decreases. Besides, the irradiation region per one device is shorter, which induces an excessively high line speed and makes it impossible to perform sufficient groove formation in the etching process.

Typically used steel sheets are mostly about 1 m in sheet width. Accordingly, if the number of irradiation devices is 1, it is difficult to irradiate the steel sheet uniformly with the laser across the full sheet width and, for example, the beam diameter needs to be increased to make the beam property uniform. The number of laser irradiation devices is, therefore, more preferably 2 or more. In the case of using a plurality of laser irradiation devices, the laser applied from each irradiation device need not be scanned across the full steel sheet width, as long as the sum of the respective scanning ranges of the irradiation devices covers the full steel sheet width.

The suitable number of irradiation devices also depends on the beam diameter of the laser in the direction orthogonal to the scanning direction (hereafter also simply referred to as "beam diameter"). For example, in terms of improving the magnetic property of the grain-oriented electrical steel sheet, the beam diameter is preferably 0.1 mm or less, as described later. In such a case, the number of irradiation devices is preferably 4 or 5. If the number of irradiation devices is 3 or less, the scanning rate v needs to be decreased to obtain the irradiation energy E (=(power P)/(scanning rate v)) required for resist removal, which causes lower productivity. In the case where the beam diameter is more than 0.1 mm, on the other hand, the irradiation energy E required for resist removal is obtained easily without decreasing the scanning rate v, and so the number of irradiation devices is preferably 1 to 3 and more preferably 2 or 3.

To prevent device contamination by the resist vaporized as a result of laser irradiation, the resist is preferably collected by a dust collector by air blowing or suction. Here, the air flow rate in air blowing or suction is preferably 100 m$^3$/min or less, in order to keep the steel sheet from vibrating and becoming out of focus. No lower limit is placed on the air flow rate, yet the air flow rate is preferably 10 m$^3$/min or more.

Power

In this embodiment, the laser power is 1500 W or more. The reason for this limitation is given below.

Although the resist removal ratio depends on the laser irradiation energy per unit scanning length, in the case where the irradiation energy is the same, the resist removal ratio is lower when the power is lower, as described with reference to FIGS. 1 and 3. This phenomenon appears to be due to thermal diffusion (thermal conduction). In detail, compare long-term irradiation with low power and short-term irradiation with high power. Even if the total amount of energy supplied by irradiation is the same, heat diffuses during irradiation in the former case, and so it is harder to heat the resist to the vaporization temperature. Besides, in the case of long-term irradiation with low power, heat conducts to the steel sheet during irradiation, which may cause degradation in magnetic property such as magnetostriction resulting from a structural change of the steel sheet surface layer, or a deformation of the steel sheet surface as illustrated in FIG. 3. It is therefore important to set the laser power to 1500 W or more in this embodiment. As illustrated in FIG. 1, if the power is less than 1500 W, the resist may remain partially without being removed. This hampers the formation of uniform grooves by etching, and causes a decrease in the magnetic property of the steel sheet obtained finally. The laser power is preferably as high as possible. Excessively high power, however, can damage the optical system such as polygon mirrors. The laser power is therefore preferably 16 kW or less.

Irradiation Energy Per Unit Scanning Length

The resist removal ratio depends on the irradiation energy per unit scanning length in addition to the power, as described with reference to FIG. 3. The irradiation energy is accordingly determined so that the resist removal ratio is 100%, while taking other conditions into account.

Figure 5:
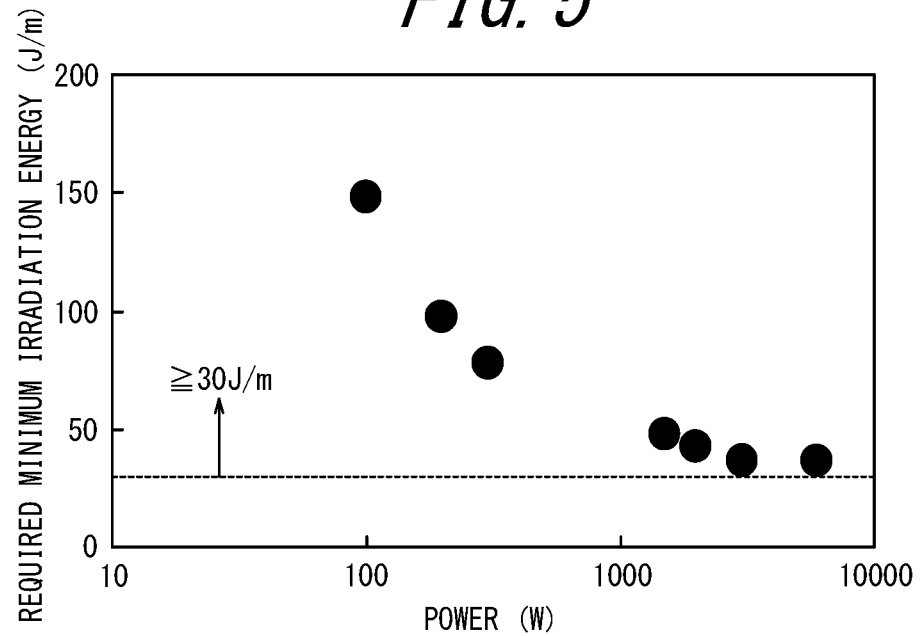
FIG. 5 is a diagram illustrating the relationship between the laser power and the minimum irradiation energy required to remove the resist at 100% with the power.

FIG. 5 is a diagram illustrating the relationship between the laser power and the minimum irradiation energy required to remove the resist at 100% with the power. In the experiment, the beam diameter was 0.2 mm, the resist thickness was 5 μm, the scanning rate was 0.5 m/s to 600 m/s, and the power was 100 W to 6000 W. As is clear from the result in FIG. 5, the irradiation energy is preferably 30 J/m or more, to achieve a resist removal ratio of 100%. Even when the irradiation energy is less than 30 J/m, a resist removal ratio of 100% can be achieved by adjusting the resist thickness (for example, to less than 5 μm). However, the resist can be removed more reliably by setting the irradiation energy to 30 J/m or more. No upper limit is placed on the irradiation energy, yet the irradiation energy is preferably 300 J/m or less. Excessively high irradiation energy increases the resist removal portion width, which may make it impossible to sufficiently reduce final iron loss.

Scanning Rate

The laser scanning rate v is not limited. A higher scanning rate v is, however, advantageous in terms of productivity as it increases the line speed $v_L$. The laser power P is expressed by P=vE, using the irradiation energy E and the scanning rate v. In the case where E is constant, P is higher when v is higher. A higher scanning rate is thus also advantageous in terms of resist removal. The scanning rate v is therefore preferably 999/(n·s) m/sec or more, where s (mm) is the spacing in the rolling direction and n is the number of laser irradiation devices. For example, suppose the steel sheet width is 1200 mm, the number n of irradiation devices is 3, and the spacing s in the rolling direction is 3 mm. When the scanning rate v is 999/(3×3) m/sec or more, i.e. 111 m/sec or more, the line speed $v_L$ is 50 mpm (meter per minute), thus achieving high productivity. If the scanning rate v is excessively high, however, the line speed increases accordingly. In the case of performing etching in the same line, the etching time shortens and grooves of a desired size cannot be formed. The scanning rate v is therefore preferably 3600/(n·s) m/sec or less.

Scanning Time

The scanning time t, i.e. the time required per one laser scan, is preferably 2.5 msec or more. The reason for this is given below. In this embodiment, the resist removal portions are formed cyclically in the rolling direction of the steel sheet, and then etching is performed to form the linear grooves at regular spacings in the rolling direction. The spacing of the formed linear grooves in the rolling direction is equal to the resist removal portion spacing. The time required for the steel sheet to travel by a distance d in the line is $s/v_L$, where $v_L$ is the line speed and s is the linear groove spacing in the rolling direction. Hence, the scanning time t needs to be a value defined by the following Expression (1):

$$t=s/v_L \qquad (1).$$

The linear groove spacing s influences the magnetic property of the steel sheet, and so is typically set to a value advantageous in terms of magnetic property. Accordingly, the line speed $v_L$ needs to be increased to shorten the scanning time t. Excessively increasing the line speed, however, causes an etching failure. For example, in an experiment of performing electroetching with a target groove depth of 30 μm, linear grooves of 30 μm in groove depth were obtained when $v_L$=96 mpm. When $v_L$=120 mpm, however, the depth of the obtained grooves was 30 μm in some part, but 25 μm in the shallowest part. This is probably because, upon increasing the line speed, the electrolytic current is increased to achieve the target groove depth in a short etching time, and temperature fluctuation of the electrolytic solution or the like results in a non-uniform groove shape. To prevent such non-uniform etching and the resulting decrease in magnetic property of the grain-oriented electrical steel sheet, the scanning time t is preferably 2.5 msec or more. No upper limit is placed on the scanning time t. An excessively long scanning time t, however, can lead to lower productivity, and so the scanning time t is preferably 8 msec or less.

Ratio of Steel Sheet Scanning Time to Scanning Time

In this embodiment, the ratio Y (=t'/t) of the steel sheet scanning time t' during which the applied laser is actually scanned on the steel sheet surface in one scan to the scanning time t per one laser scan is preferably 0.8 or less. The reason for this is given below.

In terms of preventing an etching failure, it is preferable to set the scanning time as long as possible, as mentioned above. However, an excessively long scanning time is not only disadvantageous in terms of productivity, but also disadvantageous in terms of resist removal because the scanning rate is decreased and so the laser power cannot be increased. As a result of examining this, we discovered that a sufficient scanning time can be ensured without lowering the laser power by providing, at a predetermined ratio per one laser scan, the time during which the laser emitted from the irradiation device is not applied to the steel sheet surface, as described below.

The scanning rate v can be expressed by the following Expression (2), using the scanning length L per one laser irradiation device in one scan and the scanning time t:

$$v=L/t \qquad (2).$$

Accordingly, if the scanning length L can be increased, the scanning rate v does not need to be lowered even when the scanning time t is long. Consequently, high power P (=vE) can be provided.

Figure 6:
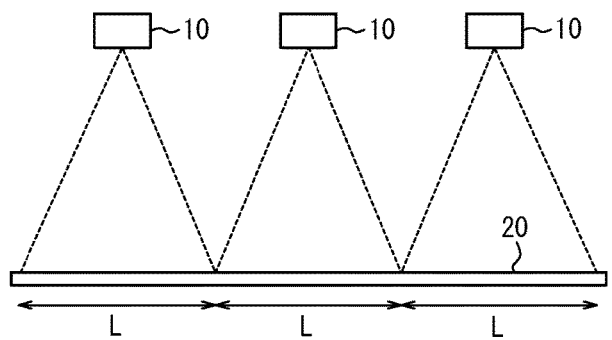
FIG. 6 is a schematic diagram of a laser scanning method according to one of the disclosed embodiments.

FIG. 6 is a schematic diagram illustrating the case of applying a laser linearly in the transverse direction of a steel sheet 20 using three laser irradiation devices 10. In the drawing, each arrow represents the scanning length L per one laser irradiation device. Here, L is set to ⅓ of the sheet width so that the laser is applied across the full sheet width by the three irradiation devices. In many cases, the scanning length L is usually set according to the size of the treatment region of the steel sheet in this way. For example, when the width of the steel sheet is 1200 mm, L is 1200 mm/3=400 mm. The scanning rate v can be expressed by the following Expression (3) from Expressions (1) and (2), using the line speed $v_L$, the scanning length L, and the linear groove spacing s:

$$v=v_L \cdot L/s \qquad (3).$$

In the case where L is 400 mm, if the linear groove spacing s is 5 mm and $v_L$ is 80 mpm, v is about 107 m/s.

Figure 7A:
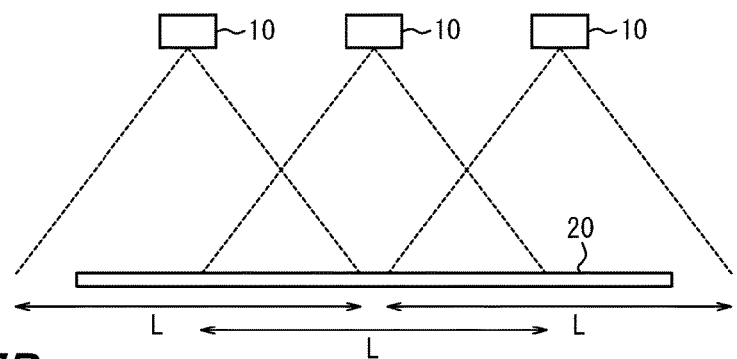
FIGS. 7A to 7C 7A, 7B and 7C are schematic diagrams of a laser scanning method according to one of the disclosed embodiments.
Figure 7B:
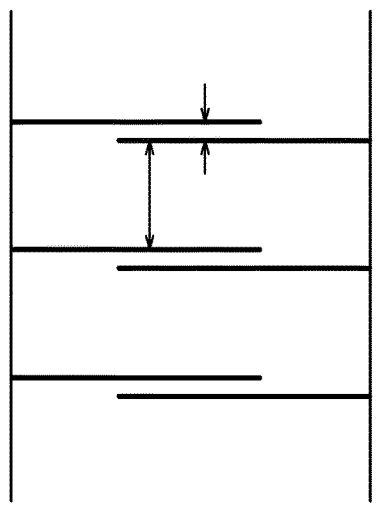
Figure 7C:
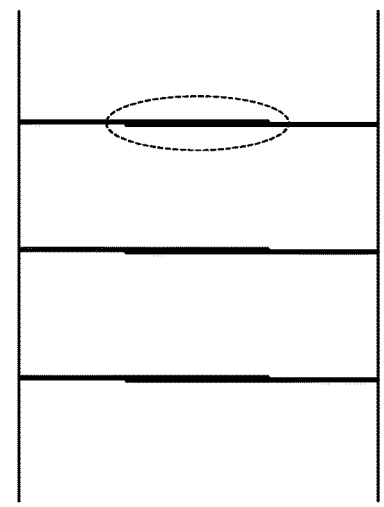

However, if the scanning length L is simply increased in the state illustrated in FIG. 6, the scanning ranges of adjacent laser irradiation devices overlap in the sheet transverse direction, as illustrated in FIG. 7A. In each region where laser irradiation overlaps, the line spacing in the rolling direction decreases as illustrated in FIG. 7B, or the groove width increases as illustrated in FIG. 7C. This causes a decrease in the magnetic property of the grain-oriented electrical steel sheet obtained finally.

Figure 8:
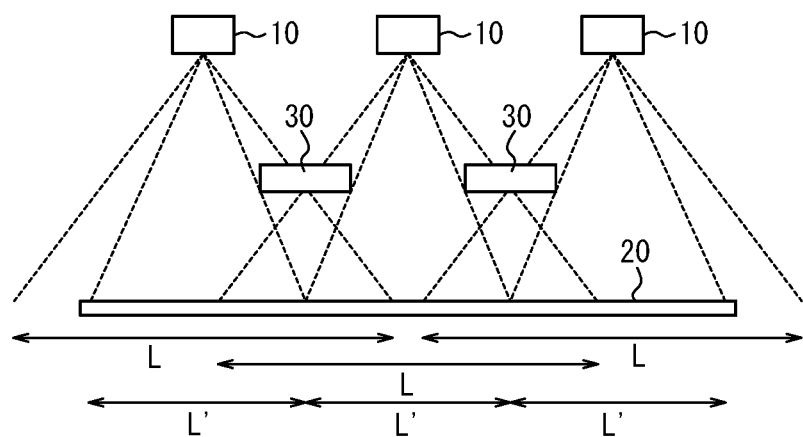
FIG. 8 is a schematic diagram of a laser scanning method according to one of the disclosed embodiments.

FIG. 8 is a schematic diagram illustrating the case where laser shielding means 30 is provided between the steel sheet and the laser irradiation devices in the condition illustrated in FIG. 7A. By installing the laser shielding means 30, the scanning length L can be increased while preventing a laser irradiation overlap in the same location on the steel sheet surface. In FIG. 8, L' is the length of the range in which the applied laser actually reaches the steel sheet surface, in the scanning length L. L' is equal to L in FIG. 6. The use of such laser shielding means allows the scanning length L to be set independently of L' which is a value determined depending on the actual sheet width and the number of laser irradiation devices, without causing a decrease in magnetic property due to an overlap of scanning ranges.

Let t' be the time (hereafter "steel sheet scanning time") during which the applied laser is actually scanned on the steel sheet surface in one scan, and Y be the ratio (=t'/t) of the steel sheet scanning time t' to the scanning time t. The scanning rate v can then be 1/Y of the case where the scanning length is L'. For example, in the case where the laser shielding means is provided so that Y=0.8, the scanning rate v is 1.25 times. In the above-mentioned case where the sheet width is 1200 mm, the number of laser irradiation devices is 3, the linear groove spacing s is 5 mm, and $v_L$ is 80 mpm, v is about 133 m/s. Likewise, when Y=0.5, v is about 213 m/s. Thus, by setting Y to less than 1, the scanning rate can be considerably increased without changing the line speed. To sufficiently achieve this effect, Y is preferably 0.8 or less. No lower limit is placed on Y, yet Y is preferably 0.1 or more in terms of cost reduction. If Y is excessively low, most of the applied laser is shielded by the laser shielding means. This lowers energy use efficiency, and leads to higher manufacturing cost. Besides, a more extensive cooling function is needed to prevent a temperature increase of the laser shielding means resulting from laser absorption, which may cause an increase in line cost.

The laser shielding means may be any means capable of shielding from the laser. A mask made of a material capable of absorbing the laser or a mask capable of reflecting the laser is preferable. In the case of using a mask made of a material capable of absorbing the laser, cooling means for cooling the mask is preferably provided as the temperature of the mask rises due to laser absorption. In the case of using a mask capable of reflecting the laser, the position or shape of the mask is preferably adjusted to keep the device from being damaged by the reflected laser. The material of the shielding means may be metal as an example. Examples of the metal include copper, molybdenum, tungsten, and any alloy thereof.

Beam Diameter

Figure 9:
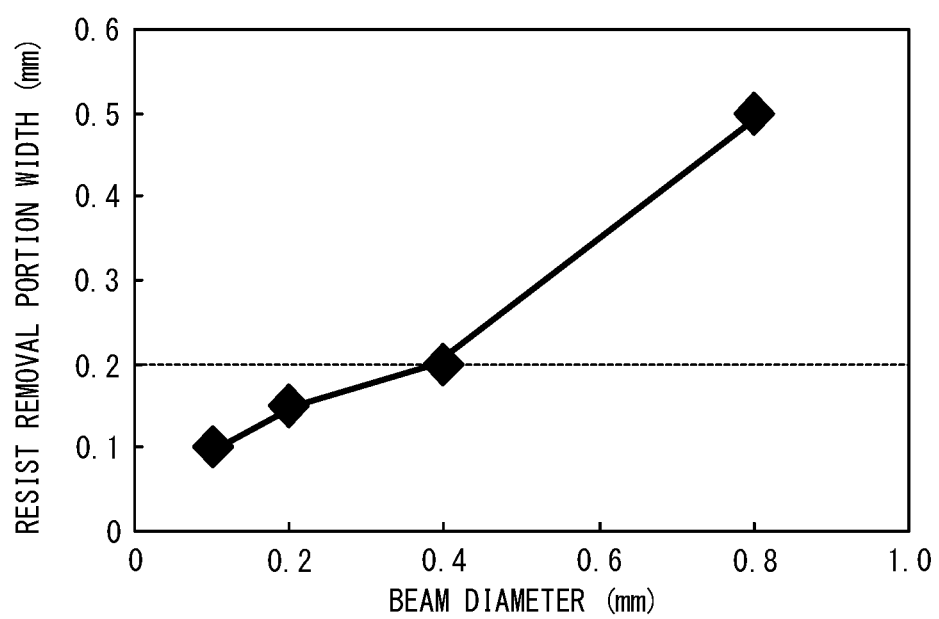
FIG. 9 is a diagram illustrating the relationship between the beam diameter and the width of a resist removal portion formed by irradiation with the laser.

The width of the resist removal portion depends on the beam diameter of the applied laser. FIG. 9 is a diagram illustrating the relationship between the beam diameter and the width of the resist removal portion formed by the irradiation with the laser when performing laser irradiation so that the resist removal ratio is 100%. As is clear from this result, the width of the resist removal portion is approximately proportional to the beam diameter of the laser. The width of the linear groove finally formed by etching is never narrower than the width of the resist removal portion, although depending on the etching conditions. Hence, the beam diameter of the laser may be selected so that a linear groove of a desired width is obtained finally. In terms of magnetic property improvement, the linear groove width is preferably 200 μm or less. The beam diameter is therefore preferably 0.4 mm or less, based on the relationship illustrated in FIG. 9. The beam diameter mentioned here is the diameter at a position where the intensity is 1/e of the maximum intensity in an intensity profile. In this description, "linear groove width", "resist removal portion width", and "beam diameter" are values in the direction perpendicular to the laser scanning direction, unless otherwise stated.

The beam diameter is more preferably 0.1 mm or less, to further improve the magnetic property. In recent years, fiber lasers have been developed, and lasers with very small beam diameters have been put to practical use. As a result of attempting to remove resist ink using a fiber laser with a beam diameter of 0.1 mm or less, we found out that a grain-oriented electrical steel sheet having particularly excellent magnetic property can be obtained. Table 1 lists the beam diameter and the iron loss $W_{17/50}$ of the grain-oriented electrical steel sheet obtained finally in the case of performing resist removal using lasers with various diameters. Here, after removing the resist ink, each groove was formed by electropolishing, and secondary recrystallization annealing and tension coating formation were performed under typical conditions. After this, the iron loss $W_{17/50}$ was measured. The results in Table 1 demonstrate that the iron loss can be further reduced by setting the beam diameter to 0.1 mm or less. As a result of examining the width of the formed linear groove after electropolishing, we found out that the linear groove width was smaller when the beam diameter was smaller. This appears to contribute to lower iron loss. Meanwhile, even when the beam diameter was decreased to 0.03 mm, the iron loss was no longer improved. This is probably because, in the case where the beam diameter is excessively small, the energy density of the beam is excessively high and such a non-uniform microstructure in the steel substrate that cannot be observed by a scanning electron microscope (SEM) is formed, or because the iron loss reduction effect by decreasing the groove width is in principle limited. The beam diameter is therefore preferably 0.03 mm or more.

TABLE 1

| Beam diameter in direction orthogonal to scanning direction (mm) | Iron loss $W_{17/50}$ (W/kg) |
|---|---|
| 0.03 | 0.694 |
| 0.05 | 0.692 |
| 0.08 | 0.693 |
| 0.20 | 0.701 |
| 0.35 | 0.705 |

Ratio of Major Axis Length to Minor Axis Length

Next, to evaluate how the shape of the laser influences the resist removal ratio, the resist removal ratio when changing the major axis length of the laser while keeping the minor axis length constant was measured. The laser was scanned in the sheet transverse direction, and the laser power was 1500 W. The laser was applied with its minor axis being in the rolling direction and its major axis being in the direction orthogonal to the rolling direction. Table 2 lists the results. The results demonstrate that the resist removal ratio is higher when the ratio (hereafter also referred to as "major-minor axis length ratio") of the major axis length to the minor axis length is closer to 1, i.e. the shape of the laser beam is closer to a perfect circle. This is probably because, with the same minor axis length, the power density expressed by "power/(beam area)" is lower when the major-minor axis length ratio is higher. The ratio of the major axis length to the minor axis length of the laser is therefore preferably 1.25 or less. Even when the laser power is the same, the power density can be improved by reducing the major-minor axis length ratio, as a result of which a sufficient resist removal ratio is achieved. If the resist removal ratio is sufficiently high, it is possible to further increase the laser scanning rate. This contributes to higher productivity. In particular, in the case of setting the beam diameter to 0.1 mm or less in terms of improving the magnetic property of the grain-oriented electrical steel sheet as mentioned above, a fiber with a small core diameter needs to be used. In such a case, increasing the laser power can be difficult. To achieve excellent productivity even with such a small-diameter beam, the major-minor axis length ratio is more preferably 1.1 or less.

TABLE 2

| Minor axis length (mm) | Major axis length (mm) | Major-minor axis length ratio | Resist removal ratio (%) |
|---|---|---|---|
| 0.2 | 0.2 | 1 | 100 |
| 0.2 | 0.25 | 1.25 | 100 |
| 0.2 | 0.4 | 2 | 20 |
| 0.2 | 3.4 | 17 | 0 |

Microstructure of Laser Irradiated Portion

Since the method according to this embodiment uses a laser with a power of 1500 W or more, the influence of the laser irradiation on the steel substrate can be reduced. In detail, in a state after annealing the grain-oriented electrical steel sheet in which linear grooves have been formed, the crystal orientation distribution in the vicinity of the groove formation portion is "equivalent" to that of a portion (hereafter referred to as "other portion") other than the groove formation portion. For example, this effect can be determined in the following manner.

Figure 10:
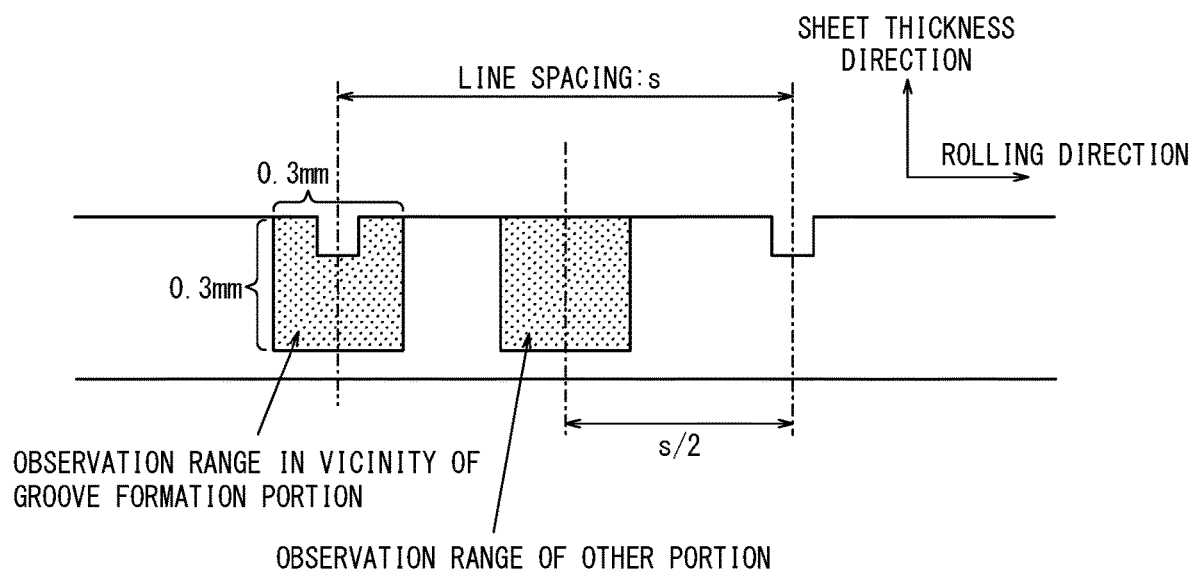
FIG. 10 is a schematic diagram illustrating a crystal orientation distribution evaluation method.
Figure 11:
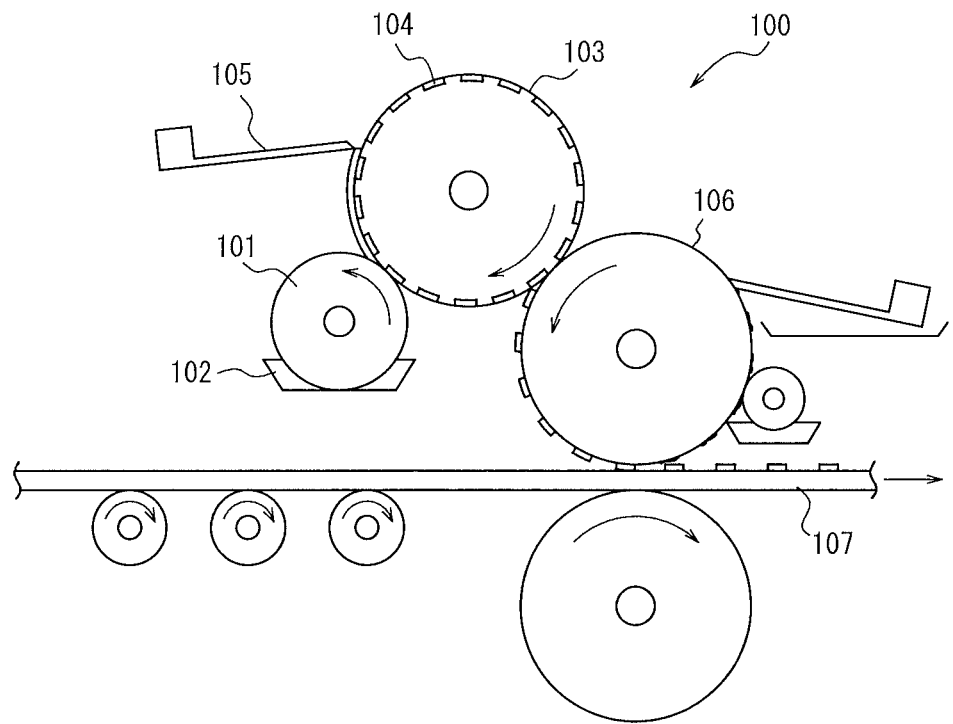
FIG. 11 is a schematic diagram illustrating a typical structure of a device used for gravure offset printing.
Figure 12:
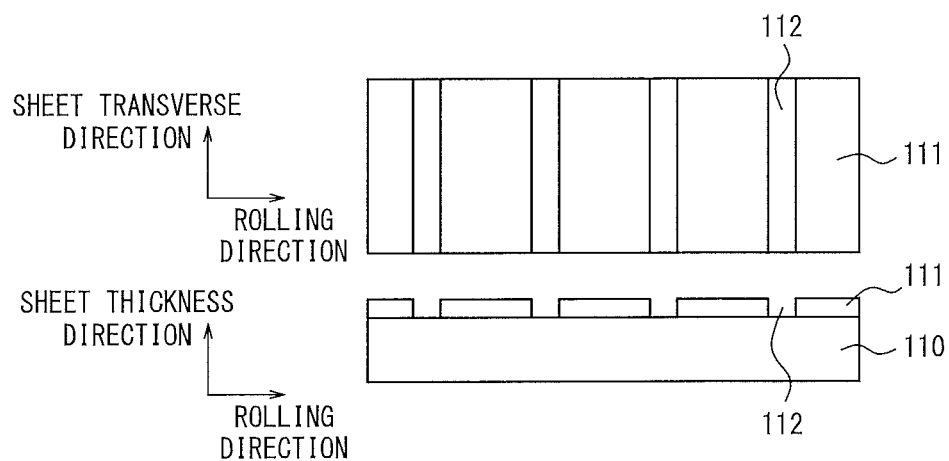
FIG. 12 is a schematic diagram illustrating an ideal resist pattern shape.
Figure 13:
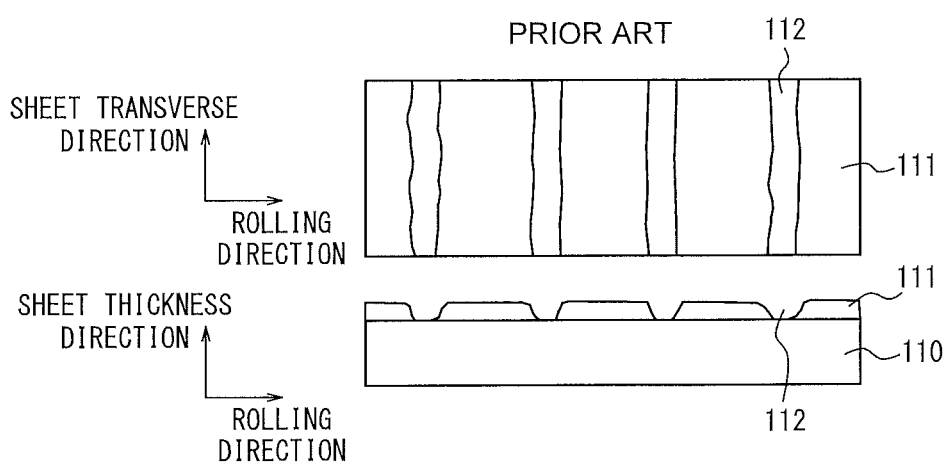
FIG. 13 is a schematic diagram illustrating an actual resist pattern shape.
Figure 14:
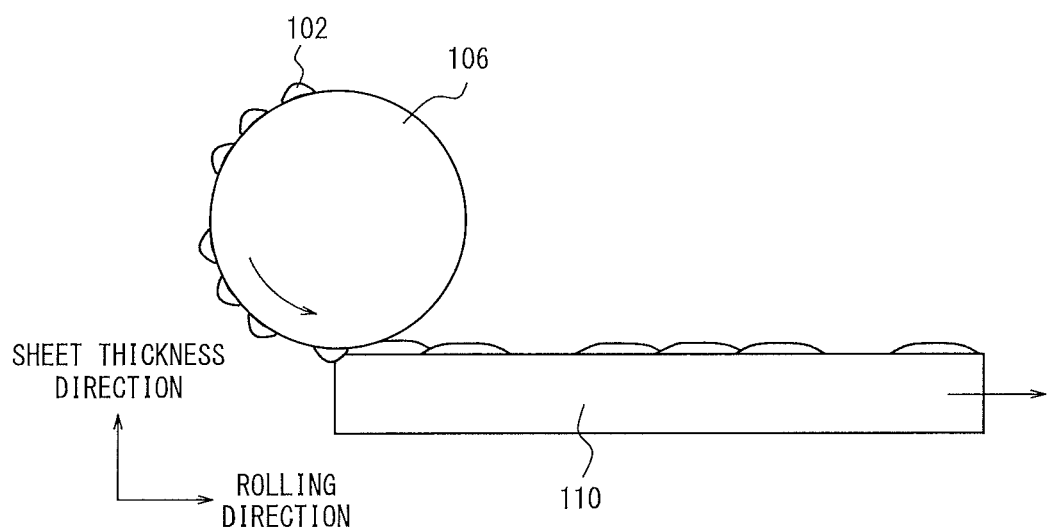
FIG. 14 is a schematic diagram illustrating an ink shape in gravure offset printing.

First, a grain-oriented electrical steel sheet in which linear grooves have been formed by etching is annealed to prepare a sample. Next, the crystal orientation distribution of a section in the sheet thickness direction is measured for both the vicinity of the groove formation portion and the other portion of the sample. The observation range in the vicinity of the groove formation portion is 0.3 mm in the rolling direction with the center line of the groove as the center and 0.3 mm in the sheet thickness direction from the steel sheet surface, as illustrated in FIG. 10. The observation range of the other portion is 0.3 mm in the rolling direction with the center point between two adjacent linear grooves as the center and 0.3 mm in the sheet thickness direction from the steel sheet surface, as illustrated in FIG. 10. In the case where the sheet thickness is less than 0.3 mm, the section observation range is the range of 0.3 mm in the rolling direction and the full thickness in the sheet thickness direction. The annealing may be performed once or twice, according to a conventional method. The crystal orientation distribution may be measured by EBSD (Electron Backscatter Diffraction) or the like. The "equivalent" crystal orientation distribution means that the maximum one of the existence ratios (area ratios) of crystal grains having (111), (110), and (100) crystal planes within 10° from the surface is in the range of "average value±2σ".

[Etching Process]

After the laser irradiation process, etching is performed to form linear grooves in the steel sheet surface. The method of etching may be any method that can etch the steel sheet. It is, however, preferable to use at least one of chemical etching and electroetching. In terms of etching quantity control, electroetching is more preferable. In the case of chemical etching, for example, a solution containing at least one selected from the group consisting of $FeCl_3$, $HNO_3$, HCl, and $H_2SO_4$ may be used as an etchant. In the case of electroetching, for example, a solution containing at least one selected from the group consisting of NaCl, KCl, $CaCl_2$, and $NaNO_3$ may be used as an etchant (electrolytic solution).

When performing etching, the etchant is preferably stirred. Stirring the etchant resolves any deviation of temperature or concentration in the etching bath, and enables more uniform etching. Moreover, the flow rate of the liquid in the bath can be increased to improve etching efficiency. The method of stirring is not limited. For example, mechanical stirring or stirring by circulating the etchant may be used. In the case of mechanical stirring, a stirring member made of resin is preferably used in terms of resistance to the etchant. In the case of stirring by circulation, for example, an etchant jetting port is provided in the etching bath so that the etchant is jetted from the jetting port using a pump or the like.

In the case of performing etching by electroetching, an electric current may be applied to the steel sheet by any method. For example, an etching bath of radial cell type or horizontal cell type may be used to apply electric current to the steel sheet in a direct manner or an indirect manner. The electrolysis conditions may be adjusted as appropriate depending on the steel sheet to be treated, the electrolytic solution used, etc. For example, the current density may be adjusted in the range of 1 $A/dm^2$ to 100 $A/dm^2$.

The shape of each linear groove formed by etching can be adjusted by the laser beam shape or the etching conditions. In terms of the magnetic property of the grain-oriented electrical steel sheet, it is preferable that the linear groove width is 30 μm or more and 200 μm or less, and the linear groove depth is 10 μm or more and 40 μm or less.

[Linear Groove Formation Device]

The groove formation method according to this embodiment is not limited, and may be performed using any device capable of the processes described above. In terms of productivity, however, a continuous treatment device capable of continuously treating a grain-oriented electrical steel sheet supplied as a coil is preferably used.

The continuous treatment device includes:

a deliverer that delivers a coiled grain-oriented electrical steel sheet;

a welder that joins coils to each other;

a resist coater that coats a surface of the grain-oriented electrical steel sheet with a resist;

a dryer that dries the resist applied on the surface of the grain-oriented electrical steel sheet;

a laser irradiator that irradiates, with a laser, the surface of the grain-oriented electrical steel sheet coated with the resist, to remove the resist partially;

an etcher that etches the grain-oriented electrical steel sheet in each portion in which the resist is removed;

a resist remover that removes the resist from the surface of the grain-oriented electrical steel sheet;

a cutter that cuts the grain-oriented electrical steel sheet; and a coiler that coils the grain-oriented electrical steel sheet, arranged in the stated order.

More preferably, the linear groove formation device further includes a looper that keeps a sheet passing rate in the laser irradiator constant. With the welder, coils are welded to each other and passed. Thus, a plurality of coils can be continuously treated without stopping the line. If the sheet passing rate decreases in part of the line during the welding or the like, the sheet passing rate in the laser irradiator decreases, too. This causes a temporary increase of the irradiation energy, and can result in variation in the magnetic property of the obtained grain-oriented electrical steel sheet. By installing a looper for keeping the sheet passing rate constant, however, the fluctuation of the sheet passing rate in the laser irradiator is suppressed to thus prevent variation in the magnetic property of the grain-oriented electrical steel sheet. For example, the looper is preferably installed between the welder and the resist coater and between the resist remover and the cutter.

The resist coater, the dryer, the laser irradiator, and the etcher in the linear groove formation device may have structures capable of performing the resist coating process, the resist drying process, the laser irradiation process, and the etching process respectively. The deliverer, the welder, the cutter, the coiler, and the looper may be, for example, devices used in a typical steel sheet treatment line.

EXAMPLES

Examples according to the disclosure are described in detail below. The following examples are preferred examples according to the disclosure, and the disclosure is not limited to the following examples. Modifications can be made to one of the disclosed embodiments as appropriate within the range in which the subject matter of the disclosure is applicable, with such modifications being also included in the technical scope of the disclosure.

Example 1

To evaluate the influence of the laser irradiation conditions, linear grooves were formed in a surface of a grain-oriented electrical steel sheet under a plurality of conditions. As the grain-oriented electrical steel sheet, a grain-oriented electrical steel sheet containing 3.4 mass % Si and having a sheet thickness of 0.22 mm was used. First, the grain-oriented electrical steel sheet was obtained by rolling according to a conventional method, and then the whole surface of the steel sheet was uniformly coated with a resist by gravure offset printing. The resist coating thickness was 7 µm.

After the resist coating, the resist was dried at 220° C. for 40 sec. Following this, the steel sheet surface was irradiated with a laser while scanning the laser linearly in the transverse direction of the steel sheet under the conditions listed in Table 3. The laser scan was cyclically performed at spacings of 3.5 mm in the rolling direction. After the end of the laser irradiation, the steel sheet surface was observed to evaluate the resist removal ratio in the laser irradiated portion and whether or not the steel substrate melted due to the laser. Table 3 lists the evaluation results.

Following this, electroetching was performed to form linear grooves. A 20% NaCl solution was used as an electrolytic solution, and the current density was adjusted beforehand so as to form desired linear grooves. The electrolysis conditions were: electrolytic solution temperature: 25° C., current density: 8 A/dm², and electrolysis time: 3 min. After the end of the etching, the resist remaining on the front and back surfaces of the steel sheet was removed using a NaOH solution. The temperature of the NaOH solution was kept at 50° C. to 70° C. Subsequently, water washing and surface cleaning were performed.

Next, after performing decarburization annealing, the difference in crystal orientation distribution between the laser irradiated portion and the other portion was examined. In detail, the crystal orientation distribution was determined as "not different" in the case where the maximum one of the existence ratios (area ratios) of crystal grains having (111), (110), and (100) crystal planes within 10° from the surface was in the range of "average value±2σ", and as "different" in the other case. Table 3 lists the evaluation results. Here, the measurement was conducted by the method mentioned above, using the measurement ranges illustrated in FIG. 10.

As a result of the above-mentioned test, in No. 1 with a laser power of less than 1500 W, a resist removal ratio of 100% was achieved by increasing the scanning time, but the steel substrate melted due to the laser, and the crystal orientation distribution was different. In each Example with a power of 1500 W or more, on the other hand, linear grooves were able to be formed without a difference in crystal orientation distribution which causes a decrease in magnetic property.

Moreover, to evaluate the influence of the resist pattern formation method, a grain-oriented electrical steel sheet in which linear grooves were formed by a conventional method was prepared as Comparative Example. In detail, a resist was printed in a pattern on a surface of a grain-oriented electrical steel sheet same as the one used in the foregoing Example, using a gravure roll whose gravure cell arrangement was adjusted so as not to apply the resist to each portion subjected to linear groove formation. To set the same conditions as the foregoing Example, the resist coating thickness was 7 µm, and the resist pattern included portions not coated with the resist (resist non-coating portions) at spacings of 3.5 mm in the rolling direction.

After the resist coating, the resist was dried under the same conditions as the foregoing Example, and the average width of the resist non-coating portion and its variation were measured. The resist non-coating portion was observed using a microscope. The width was measured at 30 points by a cutting method, and their average value was calculated. Variation in width was calculated as 1σ of the measured values at the 30 points. Table 4 lists the measurement results as No. 8. For comparison, Table 4 also lists the results of the same measurement on Example No. 7 in Table 3.

The steel sheet of No. 8 was then subjected to electroetching without laser irradiation, to form a linear groove in each resist non-coating portion. The line speed was 63 mpm, as in No. 7. Resist removal and cleaning were then performed under the same conditions as the foregoing Example.

The steel sheets of Nos. 7 and 8 after the resist removal and the cleaning were then subjected to decarburization annealing, final annealing, and tension coating formation under the same conditions, and the iron loss $W_{17/50}$ was measured. Table 4 lists variation in the measured iron loss.

As is clear from the results in Table 4, with the method of forming the resist pattern by gravure printing, the shape of the resist non-coating portion varies greatly, resulting in significant variation in the magnetic property of the grain-oriented electrical steel sheet. With the method according to the disclosure, on the other hand, the laser is used to pattern the resist, so that variation in the shape of the resist removal portion is suppressed and as a result a grain-oriented electrical steel sheet excellent in magnetic property uniformity can be obtained.

TABLE 3

| | Laser irradiation conditions | | | | | Evaluation of laser irradiation portion | | | |
|---|---|---|---|---|---|---|---|---|---|
| No. | Power P (W) | Scanning time t (msec) | Y | Beam diameter in direction orthogonal to scanning direction (mm) | Major-minor axis length ratio | Resist removal ratio (%) | Steel substrate melting by laser | Difference in crystal orientation distribution | Remarks |
| 1 | 150 | 310 | 1.0 | 0.20 | 1.0 | 100 | Melt | Different | |
| 2 | 1500 | 26 | 0.5 | 0.20 | 1.0 | 100 | Not melt | Not different | |
| 3 | 6000 | 2.1 | 1.0 | 0.35 | 1.0 | 100 | Not melt | Not different | Slightly lower etching uniformity |
| 4 | 3000 | 8 | 0.5 | 0.25 | 1.0 | 100 | Not melt | Not different | |

TABLE 3-continued

| | Laser irradiation conditions | | | | Evaluation of laser irradiation portion | | | |
|---|---|---|---|---|---|---|---|---|
| No. | Power P (W) | Scanning time t (msec) | Y | Beam diameter in direction orthogonal to scanning direction (mm) | Major-minor axis length ratio | Resist removal ratio (%) | Steel substrate melting by laser | Difference in crystal orientation distribution | Remarks |
| 5 | 3000 | 15 | 1.0 | 0.35 | 4.3 | 100 | Melt | Not different | |
| 6 | 6000 | 4 | 1.0 | 0.50 | 1.2 | 100 | Not melt | Not different | Large groove width |
| 7 | 6000 | 3.3 | 0.8 | 0.25 | 1.0 | 100 | Not melt | Not different | |

TABLE 4

| No. | Resist removal portion (non-coating portion) average width (mm) | Resist removal portion (non-coating portion) width variation (mm) | Iron loss variation (W/kg) | Remarks |
|---|---|---|---|---|
| 7 | 0.11 | 0.006 | 0.008 | Example |
| 8 | 0.07 | 0.021 | 0.016 | Comparative Example |

Example 2

Furthermore, to evaluate the influence of the beam diameter, the following experiment was conducted. First, as a metal strip subjected to groove formation, a grain-oriented electrical steel sheet containing 3.4% Si and rolled to a sheet thickness of 0.22 mm was prepared. The front and back surfaces of the grain-oriented electrical steel sheet were coated with an etching resist of 1 μm in thickness by gravure offset printing, and the resist was dried at 220° C. for 40 sec. Following this, laser irradiation was performed using a fiber laser with a beam diameter of 0.07 mm under the conditions listed in Table 5, to remove the resist ink linearly at spacings of 4 mm in the rolling direction. Next, electroetching was performed. A NaCl solution was used as an electrolytic solution, and the current density was adjusted beforehand so as to form desired linear grooves. After the etching, the resist remaining on the front and back surfaces of the steel sheet was removed using a NaOH solution. The temperature of the NaOH solution was kept at 50° C. to 70° C. Subsequently, water washing and surface cleaning were performed. Further, after performing processes such as decarburization annealing, final annealing, and tension coating formation, the iron loss was measured. The iron loss was measured by Epstein test with a total mass of test pieces of 500 g.

As is clear from the results in Table 5, by setting the laser beam diameter to 0.1 mm or less and the major-minor axis length ratio of the beam shape to 1.1 or less, a grain-oriented electrical steel sheet more excellent in magnetic property can be obtained.

REFERENCE SIGNS LIST 10 laser irradiation device
20 grain-oriented electrical steel sheet
30 laser shielding means
100 gravure offset printing device
101 pick-up roll
102 ink
103 gravure roll
104 gravure cell
105 doctor blade
106 offset roll
107 substrate
110 steel sheet
111 resist
112 non-coating portion

The invention claimed is:

1. A linear groove formation method comprising:
coating a surface of a grain-oriented electrical steel sheet with a resist;
performing a laser scan cyclically in a rolling direction of the grain-oriented electrical steel sheet, the laser scan being defined as applying a laser while scanning the laser in a direction crossing the rolling direction of the grain-oriented electrical steel sheet to remove the resist in a portion irradiated with the laser; and

TABLE 5

| | Laser irradiation conditions | | | | Evaluation of laser irradiation portion | | | |
|---|---|---|---|---|---|---|---|---|
| No. | Power P (W) | Scanning time t (msec) | Beam diameter in direction orthogonal to scanning direction (mm) | Major-minor axis length ratio | Resist removal ratio (%) | Steel substrate melting by laser | Iron loss $W_{17/50}$ (W/kg) | Remarks |
| 9 | 2000 | 3 | 0.05 | 1.02 | 100 | Not melt | 0.691 | Example |
| 10 | 2000 | 3 | 0.05 | 1.24 | 65 | Not melt | 0.703 | Example |
| 11 | 3000 | 8 | 0.25 | 1.02 | 100 | Not melt | 0.705 | Example | etching the grain-oriented electrical steel sheet in each portion in which the resist is removed, to form a linear groove, wherein a coating thickness of the resist is 0.5 μm to 10 μm, a power of the laser is 1500 W or more, a steel substrate of the grain-oriented electrical steel sheet is not melted during the laser scan, and the etching is performed by at least one of chemical etching and electroetching.

2. The linear groove formation method according to claim 1, wherein the laser scan is performed using one to five laser irradiation devices, a scanning time t per one laser scan is 2.5 msec or more, and a ratio Y of a steel sheet scanning time t' during which the applied laser is actually scanned on the surface of the grain-oriented electrical steel sheet in one laser scan to the scanning time t per one laser scan is 0.8 or less, where Y=t'/t.

3. The linear groove formation method according to claim 2, wherein the laser scan is performed using one to three laser irradiation devices, a beam diameter of the laser in a direction orthogonal to a scanning direction of the laser is more than 0.1 mm and 0.4 mm or less, and a ratio of a major axis length to a minor axis length of the laser is 1.25 or less.

4. The linear groove formation method according to claim 2, wherein the laser scan is performed using four or five laser irradiation devices, a beam diameter of the laser in a direction orthogonal to a scanning direction of the laser is 0.03 mm or more and 0.1 mm or less, and a ratio of a major axis length to a minor axis length of the laser is 1.1 or less.

5. The linear groove formation method according to claim 1, wherein the resist comprises a thermosetting resin.

* * * * *